March 24, 1931.  J. N. SMITH  1,797,376

ELECTROLYTIC APPARATUS

Filed Aug. 21, 1928  2 Sheets-Sheet 1

James N. Smith
Inventor
By Lewis J. Doolittle
Atty.

March 24, 1931.   J. N. SMITH   1,797,376
ELECTROLYTIC APPARATUS
Filed Aug. 21, 1928   2 Sheets-Sheet 2
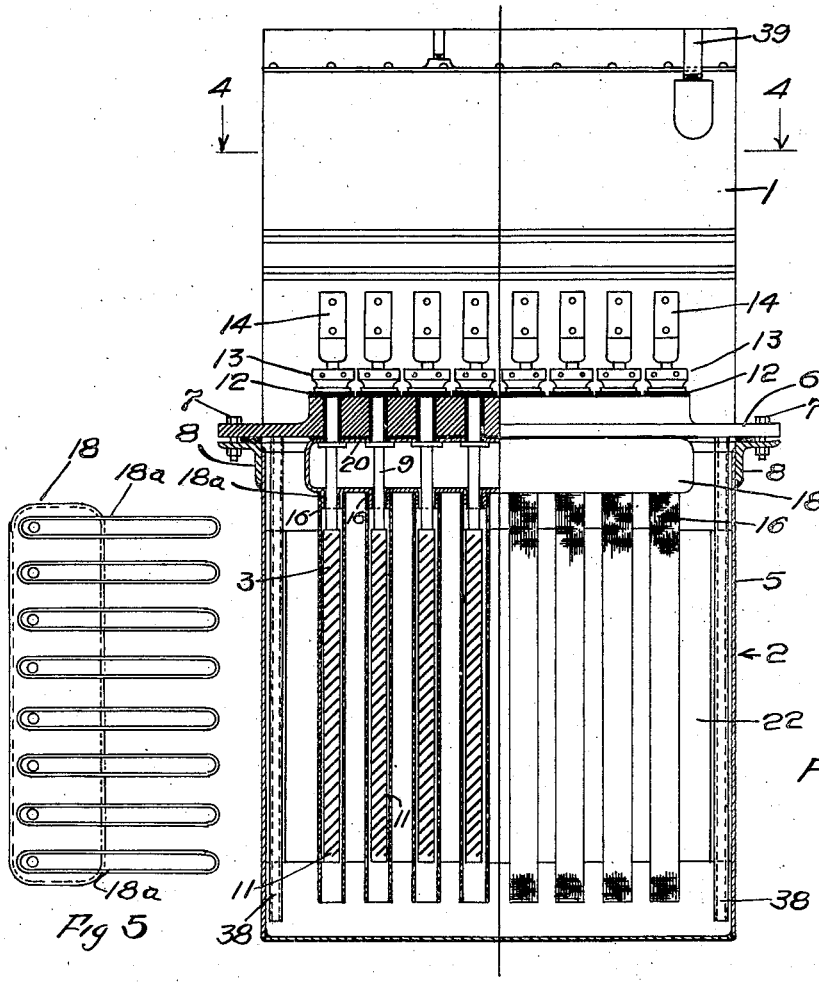
Fig 3
Fig 5
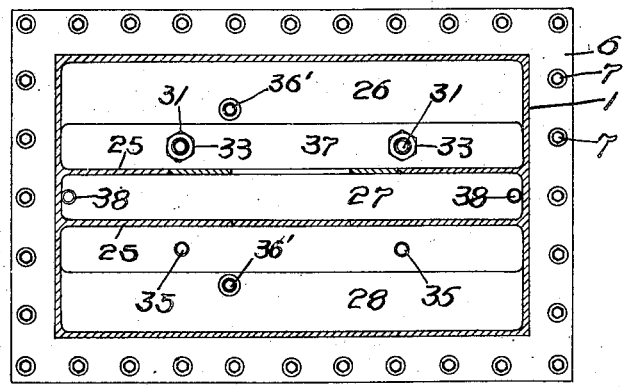
Fig 4
James N. Smith, Inventor
By Lewis J. Doolittle, Atty.

Patented Mar. 24, 1931

1,797,376

UNITED STATES PATENT OFFICE

JAMES NORMAN SMITH, OF TORONTO, ONTARIO, CANADA, ASSIGNOR, BY MESNE ASSIGNMENTS, TO WESTINGHOUSE ELECTRIC & MANUFACTURING COMPANY, A CORPORATION OF PENNSYLVANIA

ELECTROLYTIC APPARATUS

Application filed August 21, 1928. Serial No. 301,146.

This invention relates to electrolytic cells, more particularly to cells of the tank type for the electrolysis of water.

The object of this invention is to provide a combined electrolyzer and separator which shall have no exposed intercommunicating pipes, comprising a separator which is an integral unit and the base of which forms the cover for the electrolyzing tank with which it is associated, so that the same may be readily assembled.

A further object of this invention is to provide insulated means for conducting the gas-electrolyte fluid from the electrolyzing chamber of the cell to the separator, to prevent undesirable electric circuits within the separator.

A further object is to provide means for collecting the generated gases from the anode or cathode electrodes of the cell, said means being preferably common to a plurality of said anodes or cathodes.

Other features and objects of this invention will appear hereafter in connection with the description of the electrolytic apparatus embodying the various features of my invention as illustrated in the accompanying drawings, wherein—

Fig. 3 is an elevation, partly in section, of the anode side of the apparatus;

Fig. 4 is a horizontal cross-section of the separator on the line 4—4 of Fig. 3, and Fig. 5 is a detail bottom view of a gas bell.

Figure 1:
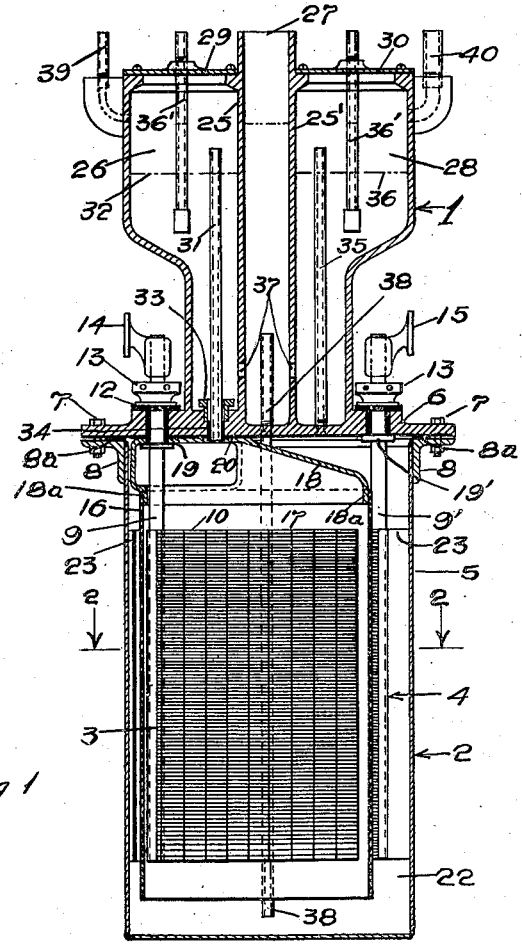
Fig. 1 is a vertical cross-section through the separator and electrolyzer composing the said apparatus.

The electrolytic apparatus, herein described and illustrated is by way of example only and not intended to limit the scope of the invention. Said apparatus comprises a separator 1 and an electrolyzer 2. The electrodes 3 and 4, anode and cathode, respectively, are suspended within the electrolyzing container 5 from the base 6 of the separator 1, which functions also as the cover for said container.

It should be observed here that the bolts 7 are not insulated, but the angle irons 8 at the top of container 5 for attaching the container to the base are separated from the base 6 by a liquid and gas tight gasket 8a.

The electrodes 3 and 4 may comprise, generally, a stud or main conducting member 9, 9' of high electrical conductivity and a U-shaped foraminous electrolyzing element 10, the anode elements being preferably of nickel or nickel plated iron or steel, and the cathode elements of iron. The stud 9 preferably comprises a copper core or rod having a sleeve or shell of passive metal, such as iron or steel, to protect it from the action of the electrolyte and nickel plated to protect it from oxygen gas. The foraminous element 10 is welded or otherwise joined to the protective sleeve and to a cover plate 11, 11', as described more specifically in my copending application.

While this form and construction for the electrodes is preferred, it will be apparent that other forms may be used.

The anode conducting members 9 pass through, and are insulatively attached to the base 6, as indicated at 12, by means of nuts 13 threaded on said members, the cathode members 9' being in electrical contact with base 6, as indicated by 19' and mounted on the upper extremity of the said members are positive and negative terminals 14—15 respectively.

Figure 2:
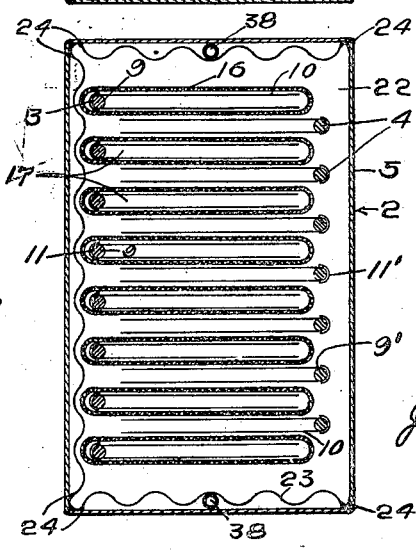
Fig. 2 is a horizontal cross-section on the line 2—2 of Fig. 1.

The electrodes 3 and 4 are alined, respectively, on opposite sides of the container, and disposed between adjacent elements (Fig. 2). Each anode electrode 3 is disposed within a tubular diaphragm 16 to form individual anode chambers 17 wherein the generated gas and anolyte rises and is discharged, in the manner described hereafter, into the anolyte compartment of the separator.

The diaphragms 16 extend below and above the foraminous elements 10 closely adjacent the outer surfaces of each electrode and the upper portion of the diaphragms embrace the lips or flanges 18a of a gas collecting bell 18 (Fig. 5) so that all the anode chambers 17 communicate with said bell, discharging thereinto both anolyte and oxygen.

The gas bell 18 is supported between the base 6 and shoulders 19 on the conducting members 9, and is insulated from the base of the separator by an insulating strip 20 disposed between the bell and said base. The bell 18, therefore, has no direct electrical contact or connection with the apparatus, and hence avoids the possibility of electrolytic action.

It will be observed that the container 5 is essentially a cathode chamber 22 in which the anode chambers 17, circumscribed by the diaphragms 16 and the bell 18, are enclosed.

Three sides of the container 5 are lined with a corrugated cathode sheet 23 (Fig. 2) which protects the container from undesirable electrolytic action in the vicinity of the anode electrodes and act electrolytically. The sheet is welded to the corners of said container, as indicated at 24.

It will be observed that the anode electrodes, diaphragms and bell form a unitary structure.

The cathode electrodes are attached to the base 6 of the separator and the cathode foraminous elements are disposed between adjacent diaphragms enclosing the anode electrodes and positioned alternately therewith.

The separator 1 may be cast integrally or be constructed of sheet metal, and is provided with transverse partition walls 25, 25', (Fig. 1) which divide the separator into three compartments, respectively, the anolyte 26, diffusion 27, and the catholyte compartment 28. The diffusion compartment 27 is open, but the other two compartments are provided with gas tight covers 29 and 30, respectively.

Communicating with the bell 18 is a tube 31 (Fig. 1) of insulative material, such as glass, which extends up into the anolyte compartment 26 above the predetermined level 32 of the anolyte therein. The said tube 31 is removable and resiliently supported by a metal bushing 33 inserted in the base 6, and the tube is fitted with a gas tight sleeve 34.

Communicating with the cathode chamber 22 of the electrolyzer is a metal tube 35 mounted in the base 6 of the separator and which extends into the catholyte compartment 28 and above the predetermined level 36 of the catholyte.

The glass tube 31 conveys oxygen and electrolyte from the bell or anode chamber to the anolyte compartment 26, and tube 35 conveys hydrogen and electrolyte from the cathode chamber 22 to the catholyte compartment 28.

The anolyte and catholyte compartments may also be provided with a baffle and screens for separating the gas from the anolyte and catholyte, such as described in my copending application.

The insulated glass tube 31 and the metal tube 35 may be interchanged, the glass tube being used in the catholyte compartment 28 and the metal tube in the anolyte compartment 26 instead of the arrangement above described.

Disposed within said anolyte and catholyte compartments 26 and 28 and projecting through their respective covers 29 and 30 are safety devices 36', 36', operative as a vent to the outside atmosphere when there occurs excessive pressure within the compartments.

The liquid in the anolyte and catholyte chambers flows into the diffusion compartment 27 through submerged openings 37 in the partition walls 25 and 25'.

A pipe 38 extending into the diffusion compartment 27 conducts the electrolyte back into the electrolyzer 2, the lower end of said pipe extending almost to the bottom of the container 5, and the upper end extending sufficiently above the submerged openings 37 and the base 6 to prevent the settled out sludge in the separator from being carried back into the electrolyzer.

The oxygen and hydrogen, separated out in the separator, passes out of the separator through ports 39 and 40, respectively, to collectors provided therefor.

As many changes could be made in the above construction and many apparently different embodiments of my invention designed without departing from the spirit of the invention as defined in the accompanying claims, I intend that all matter contained in the above description or shown in the accompanying drawings shall be interpreted as illustrative merely of an operative embodiment of my invention and not in a limiting sense.

Having described my invention, what I claim is:

1. In an electrolytic cell of the tank type, means for protecting the tank or container from electrolyzing action, comprising a sheet electrode having the polarity of one of the sets of the electrodes and disposed along the walls of the container adjacent the electrodes of opposite polarity.

2. In an electrolytic cell of the tank type, means for protecting the container from electrolyzing action, comprising a corrugated sheet of metal having the polarity of one of the sets of electrodes used, said sheet being disposed along the walls of the container adjacent the electrodes of opposite polarity and electrically connected to said container.

3. In electrolytic apparatus of the tank type, in combination, a gas collecting bell having a plurality of ports, diaphragms connected to said bell and communicating therewith through said ports, electrodes disposed within said diaphragms, electrodes of opposite polarity interposed between adjacent diaphragms, and means for protecting the tank from electrolyzing action comprising a sheet electrode having the polarity of one of the sets of the electrodes employed, disposed along the walls of the tank adjacent the electrodes of opposite polarity.

4. The combination with an electrolytic cell of the tank type, of a separator having anolyte and catholyte compartments and an intermediate diffusion compartment, the base of said separator being also the cover to said cell and being provided with conduits for the distribution of gas and electrolyte to and from said cell.

5. A separator comprising a casing having a base adapted to cover a companion electrolytic cell and have communication therewith, and intermediate partition walls dividing said casing into three compartments for the reception and separation of gas and electrolyte, and rediffusion and return of electrolyte.

6. A separator comprising a casing having a base adapted to cover a companion electrolytic cell, a tube of insulative material free at its upper end and resiliently supported at its lower end and mounted in said base extending upwardly therefrom into said separator and affording communication between said separator and said cell.

7. A separator comprising a casing having a base adapted to cover a companion electrolytic cell and having communication therewith, intermediate partition walls arranged to divide the separator into anolyte, catholyte and diffusion compartments, insulated means inert to the electrolyte for conducting electrolyte and gas from one of the chambers of the cell to one of the compartments, means for conducting electrolyte and gas from the other chamber of the cell to the other compartment, and means for conducting electrolyte from the diffusion compartment to said cell.

8. A separator comprising a casing having a base adapted to cover a companion electrolytic cell and having communication therewith, intermediate partition walls arranged to divide the separator into anolyte, catholyte and diffusion compartments, insulated means inert to the electrolyte for conducting electrolyte and gas from one of the chambers of the cell to one of the compartments, means for conducting electrolyte and gas from the other chamber of the cell to the other compartment, means for conducting electrolyte from the diffusion compartment to said cell, and safety devices disposed within said anolyte and catholyte compartments adapted to vent gas to the outside atmosphere when the pressure in said compartments becomes excessive.

9. In combination, a three compartment separator having its base adapted to cover a companion electrolytic cell, said base insulatively supporting one of the electrode structures of said cell and having means affording communication between the compartments of the separator and the chambers of the cell.

10. Electrolytic apparatus of the class described, comprising an electrolyzer, a separator having a plurality of compartments, a base for the separator also forming a cover for the electrolyzer, anode and cathode electrodes suspended from said base and extending into the electrolyzer chamber, one of said electrodes being insulated from the base, a gas collecting bell attached to said base but insulated therefrom and positioned over one of said electrodes in the electrolyzer, a tubular diaphragm enclosing said last named electrode and suspended from and opening into said bell, a communicating tube of insulating material mounted in said base and extending into one of the compartments of the separator providing a communicating passage between said bell and separator compartment, a second tube mounted in said base and extending into another compartment of the separator providing communication thereto from that portion of the electrolyzer chamber in which the other of said electrodes is positioned, and a pipe also mounted on said base extending to a point adjacent the bottom of the electrolyzer chamber and providing a communicating return passage for the electrolyte from the separator to the electrolyzer chamber.

11. Electrolytic apparatus of the class described, comprising an electrolyzer, a separator having anolyte and catholyte compartments, a base for the separator also forming a cover for the electrolyzer, anode and cathode electrodes suspended from said base and extending into the electrolyzer chamber, the anode being insulated from the base, a gas collector bell attached to said base but insulated therefrom and positioned over the anode electrode in the electrolyzer, a tubular diaphragm enclosing said anode electrode and suspended from and opening into said bell, a communicating tube of insulating material mounted in said base and extending into the anolyte compartment of the separator providing a communicating passage between said bell and said anolyte compartment, a second tube mounted in said base and extending into the catholyte compartment of the separator providing communication thereto from the catholyte chamber in which the cathode is positioned in the electrolyzer, and a pipe also mounted on said base extending to a point adjacent the bottom of the electrolyzer chamber and providing a communicating return passage for the electrolyte from the separator to the electrolyzer chamber.

12. In electrolytic apparatus for the decomposition of an aqueous electrolyte, electrode structures each consisting of foraminous electrode members attached to a vertical conductor and spaced apart for the free movement of gas and electrolyte between them, one of said electrode structures being disposed within a tubular diaphragm with the surfaces of the electrode members closely adjacent the surface of the diaphragm, said tubular diaphragm extending below the electrode members and forming openings communicating with the gas and electrolyte space, and a common gas and electrolyte means connecting with said spaces.

13. In electrolytic apparatus for the decomposition of an aqueous electrolyte, electrode structures each consisting of foraminous electrode members attached to a vertical conductor and spaced apart for the free movement of gas and electrolyte between them, one of said electrode structures being disposed within a tubular diaphragm with the surfaces of the electrode members closely adjacent the surface of the diaphragm, said tubular diaphragm extending below the electrode members and forming openings communicating with the gas and electrolyte space, and a gas and electrolyte collecting bell to which each of said diaphragms is connected at its upper end to form a continuous compartment of said bell and said electrodes.

14. In electrolytic apparatus, an electrode structure comprising a plurality of foraminous electrode members each disposed within a diaphragm to form chambers, a gas collecting bell having lips adapted to support said diaphragms and afford communication between said bell and said chambers, and means for supporting and insulating said bell from the cover of the apparatus.

Signed at Toronto, Province of Ontario, in the county of York and Dominion of Canada, this 16th day of Aug., A. D. 1928.

JAMES NORMAN SMITH.